United States Patent
Hannah

(10) Patent No.: US 6,735,696 B1
(45) Date of Patent: May 11, 2004

(54) DIGITAL CONTENT PROTECTION USING A SECURE BOOTING METHOD AND APPARATUS

(75) Inventor: Eric C. Hannah, Pebble Beach, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/133,979

(22) Filed: Aug. 14, 1998

(51) Int. Cl.[7] ............................................. G06F 11/30
(52) U.S. Cl. ................. 713/189; 713/187; 713/155; 713/156; 713/157; 713/188; 713/201; 705/59
(58) Field of Search .............................. 713/187, 1, 2, 713/155–157, 188–201; 705/59

(56) References Cited

U.S. PATENT DOCUMENTS

| | | | |
|---|---|---|---|
| 5,022,077 A | * 6/1991 | Bealkowski et al. | 380/4 |
| 5,421,006 A | * 5/1995 | Jablon et al. | 395/575 |
| 5,692,047 A | * 11/1997 | McManis | 380/4 |
| 5,734,819 A | * 3/1998 | Lewis | 395/186 |
| 5,778,070 A | * 7/1998 | Mattison | 380/25 |
| 5,835,594 A | 11/1998 | Albrecht et al. | |
| 5,844,986 A | * 12/1998 | Davis | 380/4 |
| 5,917,421 A | * 6/1999 | Saunders | 380/4 |
| 5,919,257 A | * 7/1999 | Trostle | 713/200 |
| 5,970,145 A | * 10/1999 | McManis | 713/200 |

OTHER PUBLICATIONS

Schneier, Applied Cryptology, 2e page 30.*
Taylor, VirusCure—Virus–Proof Your PC, PC Computing, Feb. 1, 1992.*
Arbaugh, William, A., "A Secure and Reliable Bootstrap Architecture", www.cis.upenn.edu/was/96–35/tech–rpt.html, Dec. 1996.*
Schneier, Bruce. Applied Cryptography: Protocols, Algorithms, and Source Code in C. Oct. 1995. p. 29.*
Arbaugh, William et al. A Secure and Reliable Bootstrap Architecture. Dec. 1996.*
Microsoft Press Computer Dictionary 2nd ed. Oct. 1993. p. 215.*

* cited by examiner

*Primary Examiner*—Gregory Morse
*Assistant Examiner*—James Seal
(74) *Attorney, Agent, or Firm*—Blakely, Sokoloff, Taylor & Zafman LLP

(57) ABSTRACT

A method and system of protecting content by ensuring a secure boot of a processor environment. A processor is coupled to a certification unit which may include a decryption engine and a one-way hash unit. The certification unit is employed to ensure that only certified software is permitted access to memory containing content and that only certified software may access a content bit stream such as may flow across a 1394 serial bus from a digital video disk player. By preventing access by uncertified software, the risk of a personal computer being used as an instrumentality of piracy is reduced.

22 Claims, 4 Drawing Sheets

DIGITAL CONTENT PROTECTION USING A SECURE BOOTING METHOD AND APPARATUS

BACKGROUND OF THE INVENTION (1) Field of the Invention

The invention relates to digital content protection. More specifically, the invention relates to a secure booting mechanism for content protection.

(2) Background

Increasingly, content such as the video and audio of Hollywood movies is becoming available in digital form. Particularly with the proliferation of digital video disks (DVDs) every bit of data that makes up the/content is available for manipulation. Currently, industry groups and Hollywood are working together on a strong encryption that will protect the content from piracy. Even as the strong encryption is developed, efforts are being made to break the strong encryption.

Typically, the content, be it audio, video, or stills, might flow across a serial bus and into main memory. The serial bus may be an IEEE 1394 bus which is defined in the IEEE specification IEEE Standard for a High Performance Serial Bus, IEEE Std. 1394–1995 published Aug. 30, 1996 (1394–1995 Standard) or a subsequent revision thereof. Once the bits, even if encrypted, are stored in main memory, software executing on the processor can access those bits. The internet exacerbates the protection problem because it provides a vast network of processors which can all work to break the encryption. Even an unsophisticated user could download a favorite cracking program from the internet, then upload the results of their cracking effort and, over a relatively short period of time, the global network is likely to decrypt the content.

Instrumentalities of piracy can subject their manufacturers to huge potential liability. Here, since a personal computer (PC) can be used without modification to pirate digital content through a lawful activity (downloading from the internet), it is quite possible that PCs may be found by a court to be an instrumentality of piracy. Processor manufacturers will likely find it desirable to take steps to avoid this possible liability. To that end, products shipped should not enable piracy with a simple download.

BRIEF SUMMARY OF THE INVENTION

An apparatus and method of providing content protection by secure booting is disclosed. A processor core is coupled to a certification unit. The certification unit certifying a BIOS stored in memory responsive to a start-up request.

DETAILED DESCRIPTION OF THE INVENTION

Figure 1:
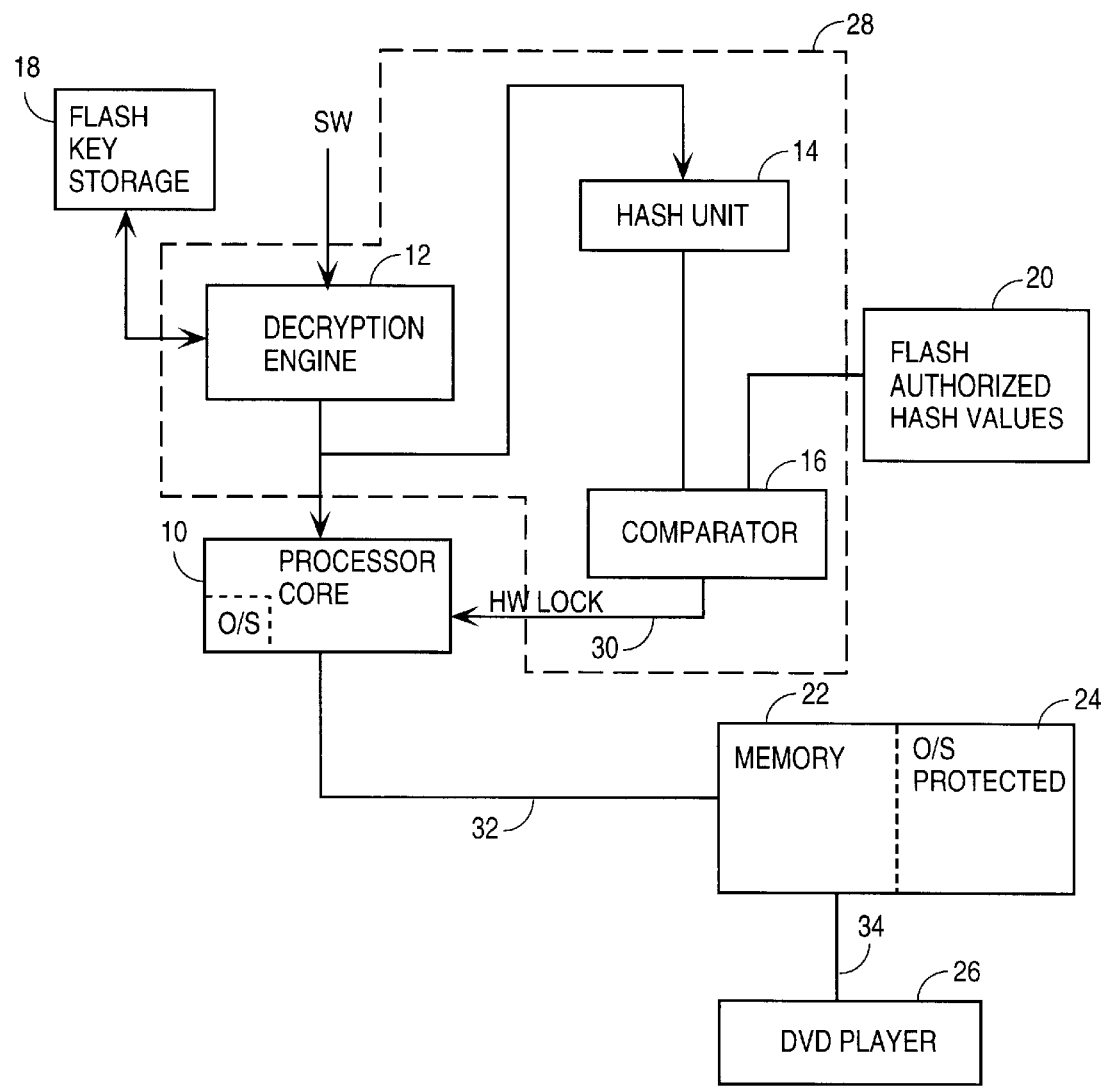
FIG. 1 is a block diagram of a system of one embodiment of the invention.

FIG. 1 is a block diagram of the system of one embodiment of the invention. A processor core 10 is coupled to a memory 22 by a bus 32. Memory 22 is partitioned into operating system (O/S) protected memory 24 which is deemed uncopyable by applications. In the remainder of the memory, which may be freely copied and/or accessed by applications executing on the processor core, a software certification unit 28 is provided to ensure that software executing on the processor core 10 is certified. Certification unit 28 includes an decryption engine 12, a hash unit 14, and a comparator 16. A flash key storage unit 18 is coupled to the decryption engine 12 to provide it with keys necessary for it to perform its decryption function. In one embodiment, decryption engine 12 will perform public key decryption and verification of digital signatures. A flash unit 20 provides authorized hash values to one input of comparator 16 as part of the certification process. Flash unit 18 and flash unit 20 may be a single flash memory unit. A digital video disk player (DVD) 26 is coupled to memory by a serial bus 34 which in one embodiment of the invention implements a 1394 protocol. In operation, a content bit stream either encrypted or unencrypted will flow across the serial bus 34 to memory 22. In one embodiment, the bit stream will be stored in protected memory 24. In that manner, if the O/S is not compromised, the content cannot be copied and pirated. Certification of the BIOS and O/S described below reduces the risk of unauthorized access to content.

Typically, software entering the system is routed through decryption engine 12. If the software is encrypted, decryption engine 12 decrypts the software and forwards it to either or both of the processor core and hash unit 14. Hash unit 14 forms a one-way hash of the incoming software. The resulting hash value is compared with an authorized hash value which is retrieved from the flash unit 20, responsive to a signal from the decryption engine. If the comparator does not find identity between the authorized hash value and the incoming hash value, a hardware lock signal 30 is asserted and the software is not permitted entry to the processor core 10. As used herein, software may refer generically to BIOS, operating systems, or applications. Alternatively, when the hardware lock signal is asserted, the operating system may restrict access privileges of the uncertified applications.

At startup, the first software entering the certification unit will be the system BIOS. System BIOS is typically stored in non-volatile flash memory. The BIOS may be encrypted or unencypted. In either case, a hash of the BIOS is compared with an expected hash of the BIOS. If the comparison does not result in an identity, the processor will not boot. Assuming the BIOS is successfully certified, it will begin to boot the operating system (O/S). The O/S must also be certified. It may follow the same certification process routing through the decryption engine and hash unit or alternatively, the BIOS may perform the certification. If the O/S is successfully certified, the O/S or the BIOS may certify applications, or the applications may again be run through the certification unit 28.

Figure 2A:
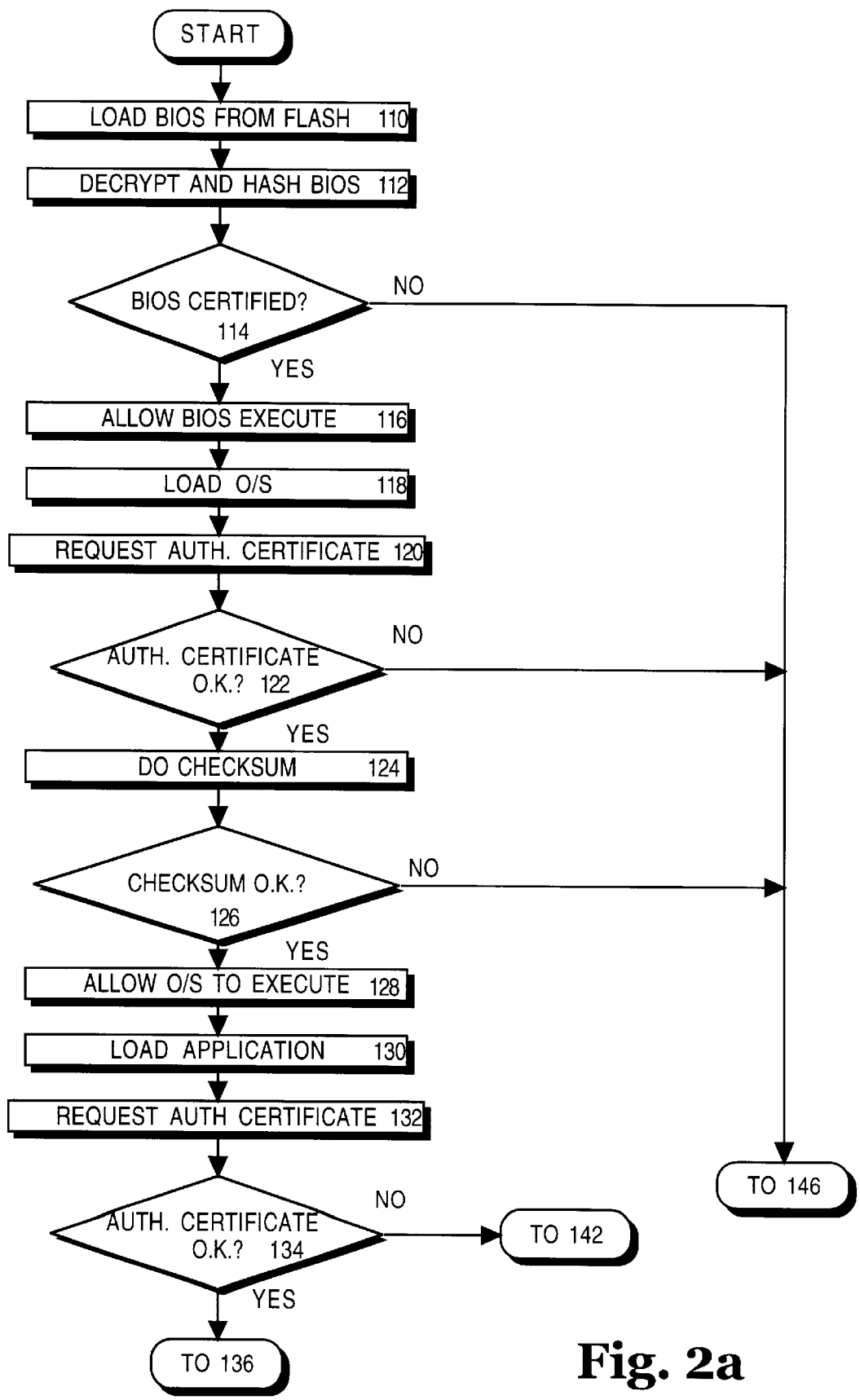
FIGS. 2a and 2b show a flow chart of startup certification in one embodiment of the invention.
Figure 2B:
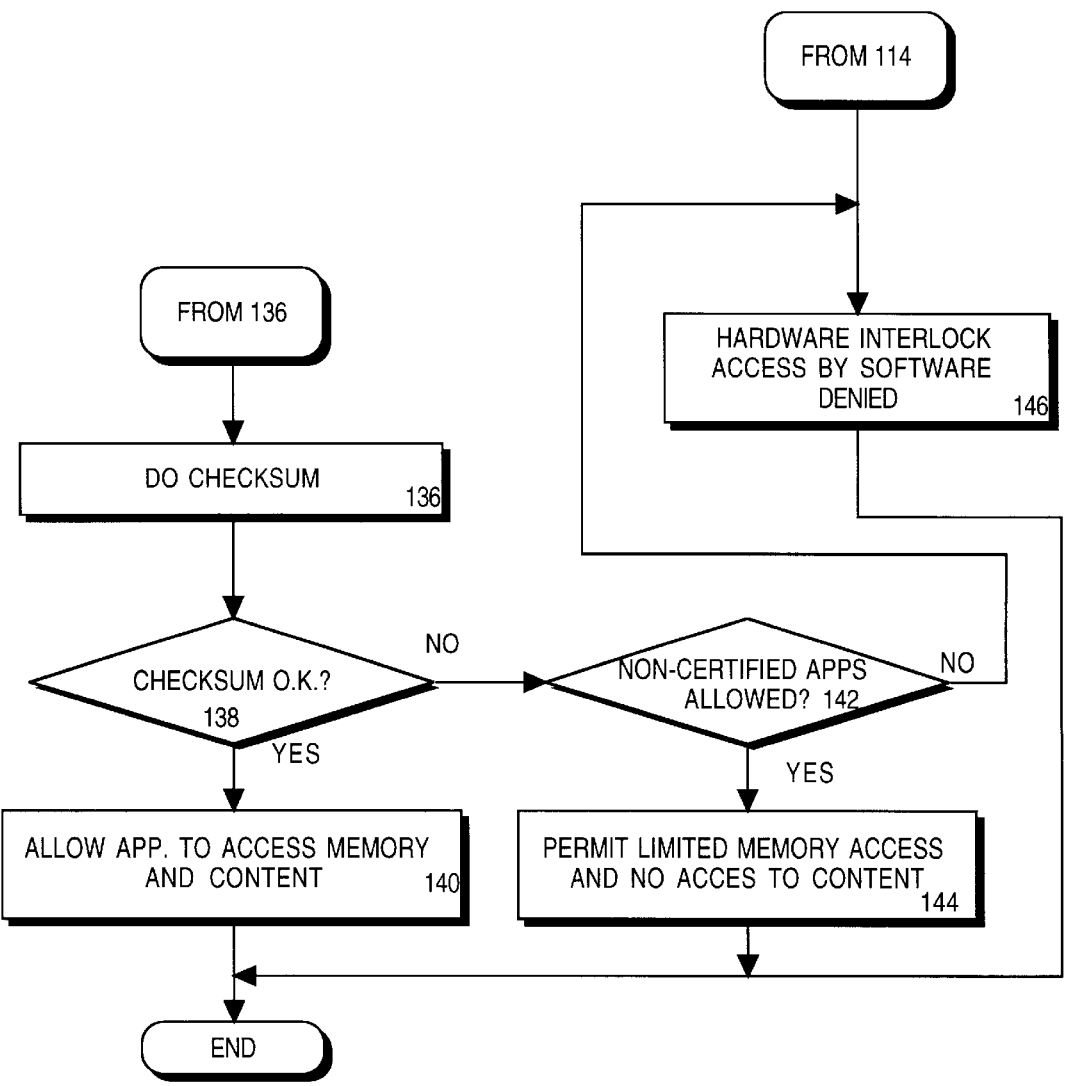

FIGS. 2a and 2b show a flow chart of a secure boot in one embodiment of the invention. In response to a start request, e.g., power-up, restart, etc., the BIOS is loaded from a flash memory at functional block 110. The certification unit decrypts (if necessary) and hashes the BIOS at functional block 112. The hash of the BIOS is then compared with an expected hash for a certified BIOS. A determination is made at decision block 114 if the BIOS should be certified based on that comparison. If the BIOS is certified, the BIOS is allowed to execute at functional block 116.

Once the BIOS completes its initialization routines, the BIOS initiates a load of the operating system at functional block 118. The BIOS will then certify the O/S. Initially, at functional block 120, the BIOS will request an authentication certificate from the O/S. The O/S will return the authentication certificate via handshaking signals between it and the BIOS. The BIOS will determine if the authentication certificate is okay at decision block 122. If it is, the BIOS will perform a checksum on the operating system at functional block 124. By performing the checksum, the BIOS ensures that the operating system has not been hacked. This prevents the O/S certifying itself based on a certificate which is otherwise isolatable from the entire content of the O/S. In one embodiment, the O/S provides to the BIOS, in addition to its authentication certificate, an encrypted checksum. The encrypted checksum is compared with the checksum generated by the BIOS.

A determination is made based on the success or failure of the checksum comparison whether the checksum was okay at decision block 126. If the checksum was okay, the O/S is permitted to execute on the processor at functional block 128. The O/S may then load applications at functional block 130.

After the application is loaded, the O/S will request an authentication certificate from the application at function block 132. The operating system will determine if the authentication certificate is okay at decision block 134. If the authentication certificate is okay, the operating system will further perform a checksum on the application at functional block 136. A determination is made at functional block 138 whether the checksum was okay. If the checksum is okay, the application will be allowed to access memory and content at functional block 140. If the authentication certificate provided by the application is not okay or the checksum fails, an implicit determination is made at decision block 142 whether the system permits non-certified applications. If it does permit non-certified applications, the operating system must police the applications to ensure that they are provided only limited memory access and no access to content at functional block 144. If the BIOS certification fails at decision block 114 or the operating system certification fails at decision blocks 122 or 126, or if non-certified applications are not allowed at implicit decision 142, a hardware interlock will occur at functional block 146 and access by the respective software will be denied.

In the foregoing discussion, the hardware certifies the BIOS and then the BIOS certifies the operating system and the operating system subsequently certifies incoming applications. It is also within the scope and contemplation of the invention for the hardware to perform all certification. It is further within the scope and contemplation of the invention to have the BIOS perform all certification beyond the certification of itself. However, by only requiring the hardware to certify the BIOS and then permitting the BIOS to certify the operating system and so forth, the flexibility of the system is increased. Specifically, it is possible that new versions of BIOS or other software will necessitate changes which are more easily made in the BIOS or operating system for certification purposes than to the hardware itself. The likelihood of such changes increases with each relative layer. This may be particularly important, where for example, one form of encryption is cracked or keys become known. It may be necessary to update the key store and/or the hash store. This may be done using a certified BIOS or a certified application, as appropriate.

Figure 3:
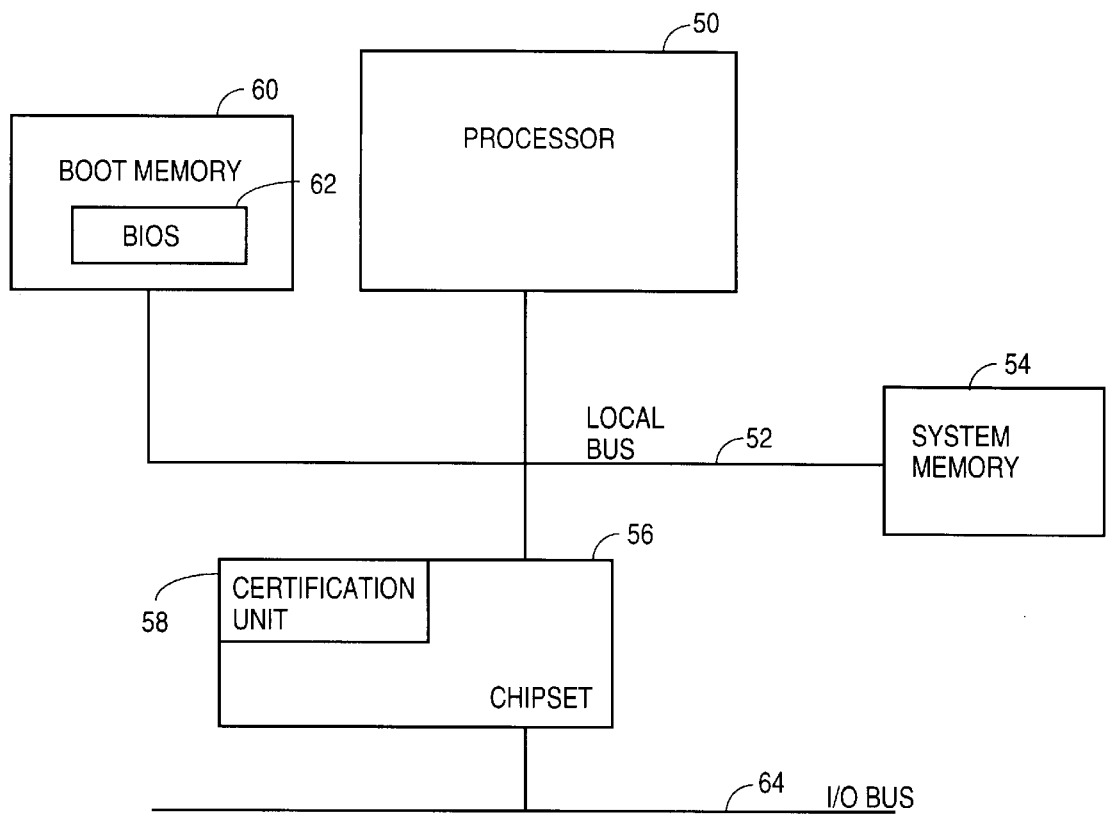
FIG. 3 is a block diagram of a system of an alternate embodiment of the invention.

FIG. 3 is a block diagram of an alternative embodiment of the invention. A processor 50 is coupled to a bus 52. A system memory 54 is also coupled to the bus. The boot memory 60 containing BIOS 62 is similarly coupled to the bus. A chipset 56 is coupled between the bus 52 and I/O bus 64. Chipset 56 includes a certification unit 58 which is used to certify the BIOS 62 before it is permitted control of the processor 50. Either the certification unit 58 or the BIOS 62 or both in conjunction may then certify subsequent software elements as described above.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
   certifying a BIOS with a hardware instantiated certification unit before completion of a boot operation;
   certifying an operating system (O/S) with one of the hardware instantiated certification unit and the BIOS once the BIOS is certified; and
   preventing access by any uncertified software to a portion of a memory.

2. The method of claim 1 wherein the certification unit is either part of a chipset or part of the processor.

3. The method of claim 1 wherein certifying comprises:
   verifying a digital signature.

4. The method of claim 1 further comprising:
   certifying an application loaded into the memory.

5. The method of claim 1 further comprising:
   aborting a boot if either the BIOS or the O/S fails certification.

6. The method of claim 1 wherein certifying an O/S comprises:
   requesting and receiving an authentication certificate and an encryption checksum;
   verifying the authentication certificate;
   generating an actual checksum for the O/S;
   decrypting the encrypted checksum; and
   comparing the encrypted checksum with the actual checksum.

7. An apparatus comprising:
   a processor core;
   a certification unit coupled to the processor core, the certification unit to certify all software directly or indirectly prior to execution on the processor core; and
   a boot memory coupled to the processor core, the boot memory storing a BIOS, the BIOS certified by the certification unit responsive to a start request.

8. The apparatus of claim 7 further comprising:
   a chipset coupled to the processor core and a system memory.

9. The apparatus of claim 7 wherein the processor core and the certification unit are fabricated on a single chip.

10. The apparatus of claim 8 wherein the certification unit is part of the chipset.

11. The apparatus of claim 7 further comprising:
    a non-volatile key storage unit; and
    wherein the certification unit comprises a one-way hash unit and a public key decryption engine.

12. A system comprising:
    a bus;
    a processor coupled to the bus;
    a memory coupled to the bus;

a digital content source coupled to the memory to provide content that may be stored in the memory and processed by the processor; and a certification unit wherein all software with access to the content is certified, directly or indirectly, by the certification unit.

13. The system of claim 12 wherein the certification unit is instantiated as part of a chipset.

14. The system of claim 12 wherein the certification unit is instantiated on a single chip with a processor core.

15. The system of claim 12 wherein the certification unit comprises:

a decryption engine; and a hash unit.

16. The method of claim 1 further comprising preventing completion of a boot operation if the BIOS is uncertified.

17. The method of claim 1 further comprising certifying all software prior to execution on a processor core.

18. The method of claim 17 further comprising preventing any uncertified software from executing on the processor core.

19. The apparatus of claim 7 wherein a boot operation is prevented from completing if the BIOS is uncertified.

20. The apparatus of claim 7 wherein the certification unit prevents, directly or indirectly, any uncertified software from executing on the processor core.

21. The system of claim 12 wherein the system is prevented from booting if the BIOS is uncertified.

22. The system of claim 12 wherein the certification unit prevents, directly or indirectly, any uncertified software from accessing a portion of the content.

* * * * *

UNITED STATES PATENT AND TRADEMARK OFFICE
CERTIFICATE OF CORRECTION

PATENT NO. : 6,735,696 B1
DATED : May 11, 2004
INVENTOR(S) : Hannah

It is certified that error appears in the above-identified patent and that said Letters Patent is hereby corrected as shown below:

Column 1,
Line 16, delete "the/content" and insert -- the content --.

Signed and Sealed this

Thirty-first Day of August, 2004

JON W. DUDAS
*Director of the United States Patent and Trademark Office*